Figure 2:
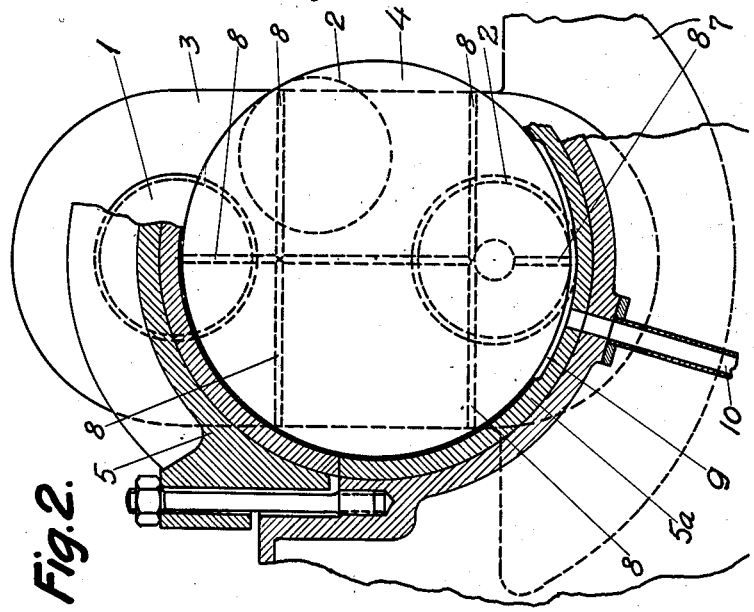

Oct. 8, 1940.  T. V. HEMMINGSEN  2,217,550
CRANKSHAFT
Filed Sept. 7, 1938   2 Sheets-Sheet 1

T. V. Hemmingsen
Inventor
by Glascock Downing & Seebold
Attys.

Oct. 8, 1940.   T. V. HEMMINGSEN   2,217,550
CRANKSHAFT
Filed Sept. 7, 1938    2 Sheets-Sheet 2
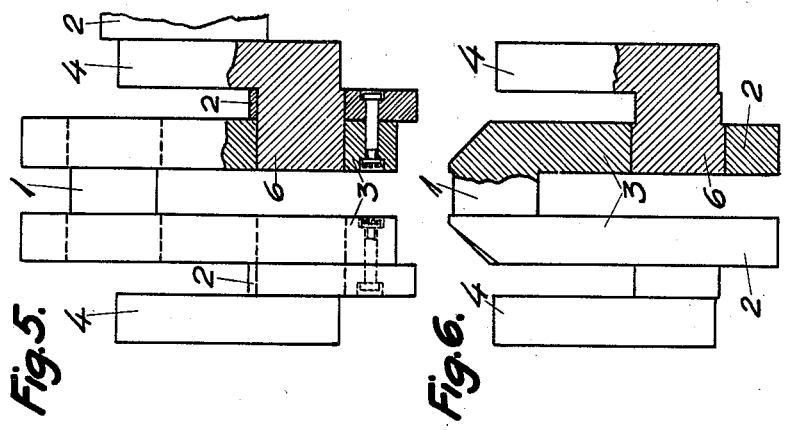
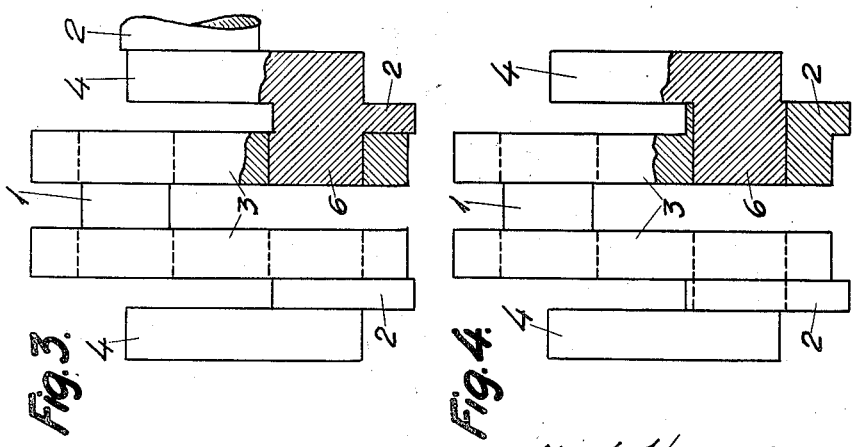
T. V. Hemmingsen
Inventor Patented Oct. 8, 1940

2,217,550

UNITED STATES PATENT OFFICE 2,217,550

CRANKSHAFT

Torkild Valdemar Hemmingsen, Copenhagen, Denmark

Application September 7, 1938, Serial No. 228,867
In Denmark September 28, 1937

5 Claims. (Cl. 74—597)

This invention relates to crankshafts of special design suitable for multi-cylinder engines of the type operating with pistons travelling in opposing directions, whereby mainly internal combustion engines and more particularly Diesel engines are considered.

In connection with such engines comprising two or more pistons travelling away from and towards one another within the same cylinder (or possibly in two cylinders arranged longitudinally in series) it has hitherto been the general practice to construct the crankshaft in such a manner as to provide for each cylinder unit one crank in the centre for the inner piston and on each side of the said crank and staggered approximately 180 degrees, a crank for the outer piston or pistons, and finally on each side of the latter cranks the main bearings. This design will result in a machine of large proportions in the axial direction of the crankshaft which becomes elastic with large masses and hence assumes a low natural coefficient of oscillation affording good conditions for the creation of harmful torsional oscillations. In order to remedy this complication to some extent it has been proposed to build such crankshafts with eccentric discs in place of the two latter cranks, but this entails, on the other hand, that the stroke for the outer piston will be comparatively short.

In connection with smaller machines it has been proposed to construct the two exterior webs in the two cranks connected with the outer piston in the form of discs co-axial with the shaft and constituting journals for the main bearings, whereby the shaft is forged in one piece.

This invention has for its object the utilisation of the latter principle in connection with crankshafts for larger machines whose crankshafts do not admit of being made in one piece, but where it is of special importance to obtain a crankshaft considerably shorter than normally and much less elastic in respect of torsion, at the same time retaining the cranks for guiding the outer piston. According to this invention each main bearing journal, located between two adjacent cylinder units and common to the two adjoining cranks for the cylinder units' outer pistons, is made in one with the latter's adjoining crank pins, each of the said crank pins being shrunk into the adjoining web of the crank serving the inner piston. This gives a crankshaft design most suitable to the purpose and practicable and the crankshaft dimensions will be confined within reasonable limits.

In order to obtain a longer stroke for the outer piston than by normal design, without necessitating an increase in the diameter of the main bearing journal, the journals for the cranks adjoining a main bearing may be executed with a greater diameter than the diameter of the pins connecting the crank webs, and arranged eccentrically in relation to the latter. An increase of shrinking length will be obtained by executing the crank journals in question in one with the crank for the inner piston in the form of a kind of eccentric disc, the crank thus shaped being shrunk onto the crank pins made in one with the adjoining main bearing journals.

The invention relates, furthermore, to various other designs of the crankshaft and to a special arrangement of the crankshaft lubrication such as apparent from the following description and the claims.

Figure 1:
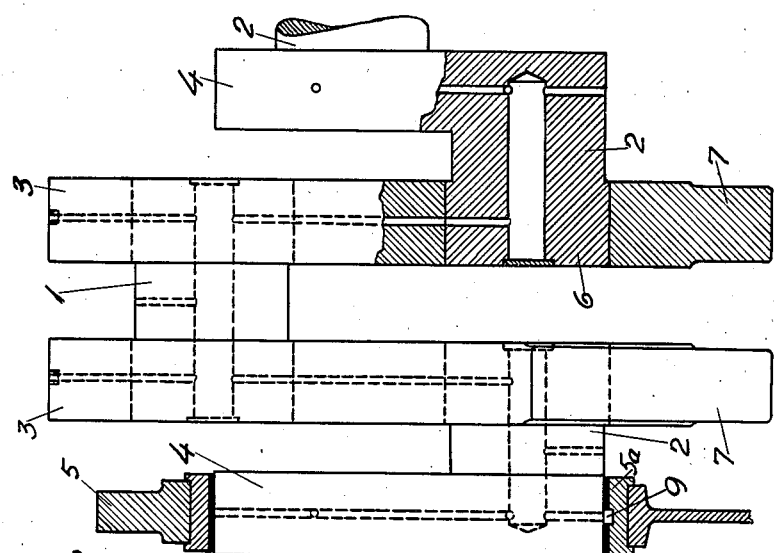

The invention is illustrated in the drawings wherein:

Fig. 1 is an elevational view of a part of a crankshaft with its bearing in a form of execution according to the invention, seen from one side and partly in section, Fig. 2, an end elevation, partly in section, of the parts shown in Fig. 1, Figs. 3 to 6 are elevational views of four other forms of execution of a crankshaft according to the invention, seen from one side and partly in section.

Fig. 1 shows three cranks of which the centre crank, whose crank pin is marked 1, controls the inner piston in a cylinder not shown but presumed to contain two pistons travelling in opposite directions, of which the outer piston is controlled by the two outer cranks, e. g., by means of a cross member and two connecting rods arranged one on each side of the cylinder, the cranks' pins being marked 6 and the journals of the latter 2. The webs 3 of the centre crank function at the same time as the one set of webs for the two outer cranks whose other, outer webs 4 are designed in the form of large discs similar to eccentric discs and which serve as bearing journals besides functioning as webs. A main bearing 3 is shown on the left hand side of Fig. 1 and in this the crank 4 in question is lodged. Each main bearing journal 4 in a multi-cylinder machine is common to two adjoining crank sets, excepting the crank journals of the two extreme cylinder units. Counterweights 7 may be arranged on the stroke of the centre crank, the figure showing the same made in one with the webs 3.

In the form of execution shown on Fig. 3 the side cranks' journal diameter has been increased as against the corresponding journals 2 in Fig. 1, at the same time being arranged eccentrically in relation to the pins 6 on the main bearing journal 4 by means of which the crank webs 3 are affixed to the side cranks by means of shrinking. This execution ensures an increased stroke in respect of the outer piston without increase of the diameter of the main bearing journal 4.

In the form of execution shown in Fig. 4 the side crank journals 2 are made in one with the centre cranks webs 3 which gives additional shrinking material for the shrinking pins 6.

In the form of execution shown on Fig. 5 the side cranks' journals are made in the form of eccentric discs 2 arranged on the shrinking pins 6, they may, as shown, be affixed to the centre crank webs 3 by means of bolts.

In the event that it is desired to reduce the rotating masses to the greatest possible extent a form of execution as shown on Fig. 6 may be utilized. Here the crank 3, 1, 3 is forged in one piece, whereas the construction otherwise corresponds with the one shown in Fig. 1.

The comparatively large diameter and the relatively small width of the main bearing, which may take the form of a plain journal bearing, necessitates a specially effective supply of lubricating oil which should at the same time lubricate the three crank journals. An oil groove encompassing the whole bearing brass which would give considerable oil losses and at the same time reduce the effective bearing area, is avoided by means of a series of interconnected holes 8 drilled in and uniformly distributed along the circumference of the main bearing journal 4 as shown on Figs. 1 and 2. The bearing brass 5a contains only one oil groove 9 extending over the circumference only slightly more than the spacing distance between the holes, i. e., in the form of execution shown, over slightly more than one-sixth of the circumference which contains six holes or drillings 8. Hence at least one hole 8 will always be covered by the oil groove 9, maintaining the oil pressure in the interconnected drillings 8. The oil is fed to the oil groove 9 through the forced lubrication passage 10, the oil being fed to the three crank journals through drillings in the crank pins and crank webs as indicated by means of the dotted lines on Fig. 1.

The lubrication passages are not shown in connection with the other forms of execution, but the lubrication may here be effected in a similar manner. In general, details of one form of execution may be utilised for the other forms of execution shown, the examples shown and described serving merely to elucidate the various features characterising the invention. The principles of the invention may also find utilisation in connection with machinery comprising three pistons travelling in opposing directions (one main and two auxiliary pistons) where the two pistons spaced farthest apart (the auxiliary pistons) may be controlled by one set of cranks only.

I claim:

1. A built-up crankshaft for multi-cylinder engines of the type operating with pistons traveling in opposite directions and having for each cylinder, one central main crank and two secondary outer cranks, the main crank having a pin arranged between two crank webs, each secondary crank having a pin arranged between one of said crank webs and an outer crank web, said outer crank webs being shaped as crank discs coaxially with the shaft and serving as journals for main bearings of the shaft, each of said crank discs being integral with the two adjoining secondary crank pins, and each of said crank pins being connected by means of shrinking with the adjoining crank web belonging to a main crank.

2. A built-up crankshaft according to claim 1, in which said outer crank pins integral with a crank disc are formed integral with journals of a diameter greater than the diameter of the crank pin itself and arranged eccentrically in relation to the former to obtain a longer stroke than normal for the outer pistons connected to said outer crank pins without increase of the diameter of the main bearing journal.

3. A crankshaft according to claim 1, in which each crank web belonging to a main crank is integral with a journal for the adjacent secondary crank pin, said journal having a diameter greater than the diameter of the crank pin itself, and being arranged eccentrically in relation to the former.

4. A crankshaft according to claim 1, in which each crank web belonging to a main crank is connected with a journal member for the adjacent secondary crank pin, said journal member having a diameter greater than the diameter of the crank pin itself and being arranged eccentrically in relation to the former.

5. A crankshaft according to claim 1, in which each main crank and crank pin thereof and crank webs are made in one piece.

TORKILD VALDEMAR HEMMINGSEN.